United States Patent [19]

Van Allen

[11] Patent Number: 4,988,842
[45] Date of Patent: Jan. 29, 1991

[54] STUD WELDING SYSTEM

[75] Inventor: Kent E. Van Allen, New Baltimore, Mich.

[73] Assignee: Emhart Inc., Towson, Md.

[21] Appl. No.: 478,653

[22] Filed: Feb. 12, 1990

[51] Int. Cl.⁵ ............................................. B23K 9/20
[52] U.S. Cl. ................................................... 219/98
[58] Field of Search .................................... 219/98, 99

[56] References Cited

U.S. PATENT DOCUMENTS 3,932,724  1/1976  Raycher ............................... 219/98

Primary Examiner—Clifford C. Shaw
Attorney, Agent, or Firm—Spencer T. Smith

[57] ABSTRACT

A stud welding system wherein welding is prevented unless the armature is located within an acceptable displacement window. A D.C. signal representative of armature position is generated by connecting differential amplifier across the coil and applying a constant voltage across the coil. The output of the amplifier is converted to a D.C. signal which is received by window comparator which will enable welding only when the armature is properly located.

4 Claims, 4 Drawing Sheets

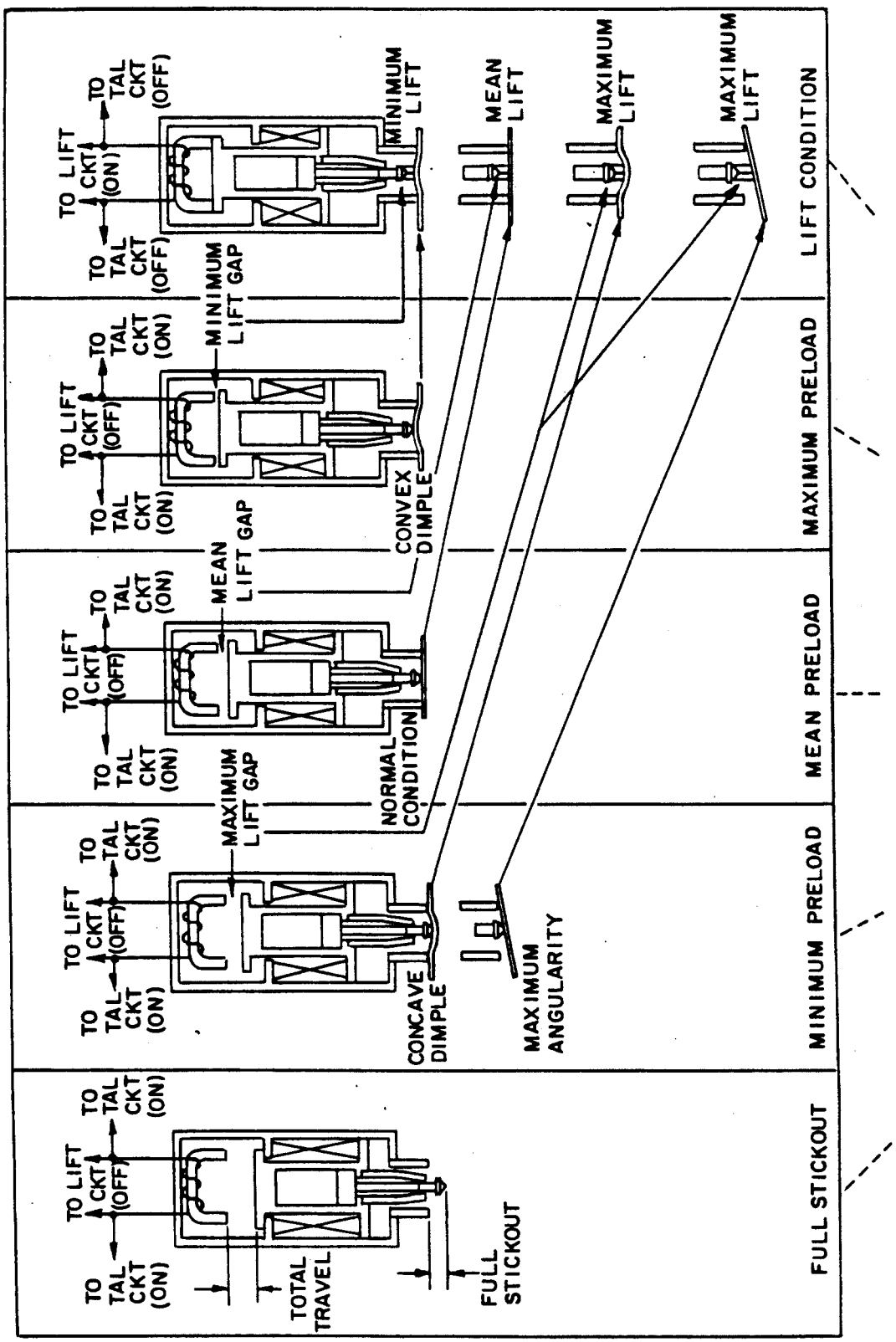

STUD WELDING SYSTEM

The present invention relates to drawn arc stud welding systems.

Lack of proper lift or arc dimension is the singe largest problem in drawn arc stud welding. Lift dimension may be adversely affected by an out of tolerance stud, deformed work or target metal, improperly adjusted lift setting, or defective or damaged weld gun/head part. Since earlier systems directly connected the trigger signal to the start weld input earlier methods of detecting a bad weld or bad weld conditions, such as measuring arc voltage and current or measuring stud height after welding, left the work surface damaged with a tack weld scar or resulted in a poorly welded stud on the surface.

It is accordingly an object of the present invention to provide early detection of a bad lift or preload dimension so that the operator will not weld with this bad condition and thereby will not cause damage to the work surface. The condition can then be corrected allowing the weld process to resume with good lift and preload conditions.

Other objects and advantages of the present invention will become apparent form the following portion of this specification and from the following drawings which illustrate in accordance with the mandate of the patent statutes a presently preferred embodiment incorporating the principles of the invention.

Referring to the drawings:

FIGS. 3A and 3B are sequence vs. preload drawings for the stud welding gun illustrated in FIGS. 1 and 2.

Figure 1:
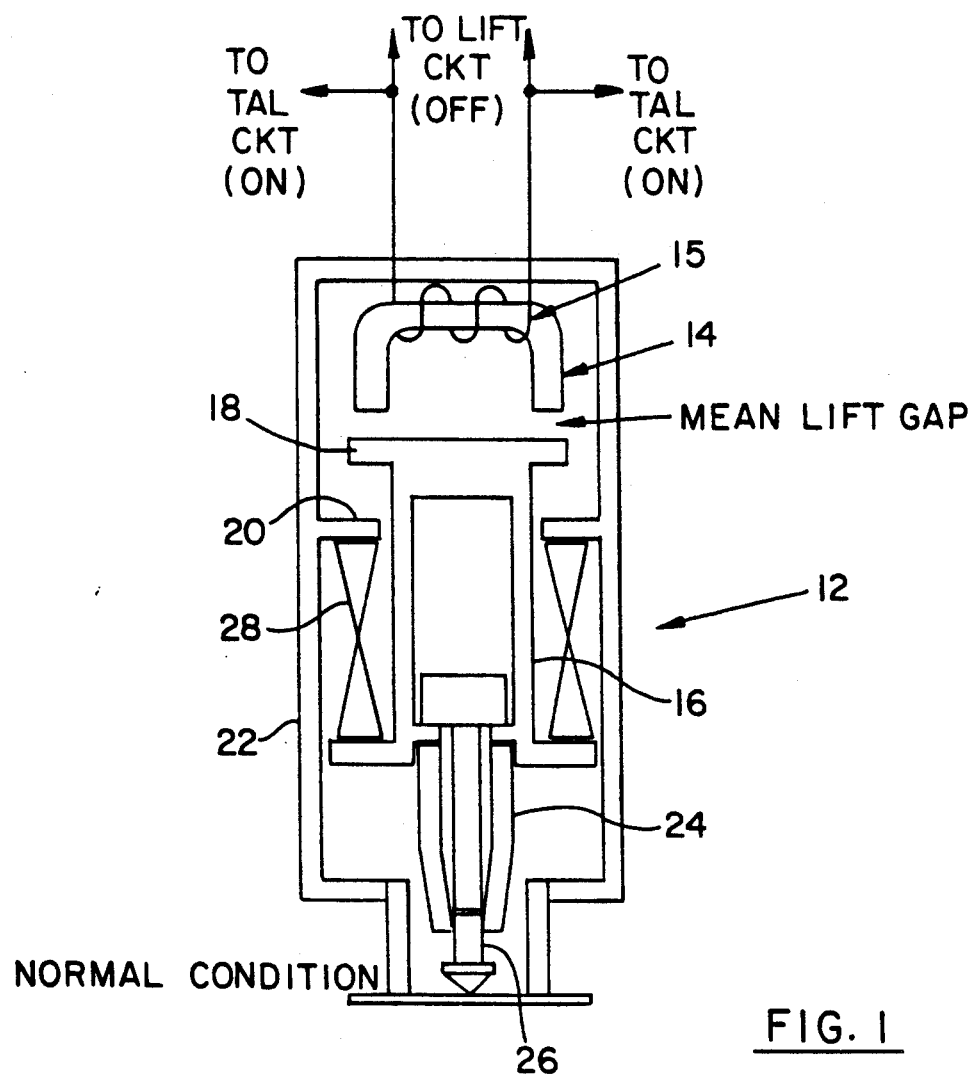
FIG. 1 is an elevational view of a portion of a stud welding gun including the lift solenoid and the stud chucking mechanism.

The stud welding gun 12 includes a D.C. lift solenoid 15 having a stator 14 and an armature 16 displaceable from a lift stop position where the armature engages the stator sequentially through minimum lift gap, mean lift gap and maximum lift gap positions to a full stickout position where further downward movement of the upper armature flange 18 is blocked by an inwardly projecting stickout stop 20 on the gun housing 22. The armature carries a chuck 24 which grips a stud 26 and a plunge spring 28 normally holds the gripped stud in the full stickout position.

Figure 2:
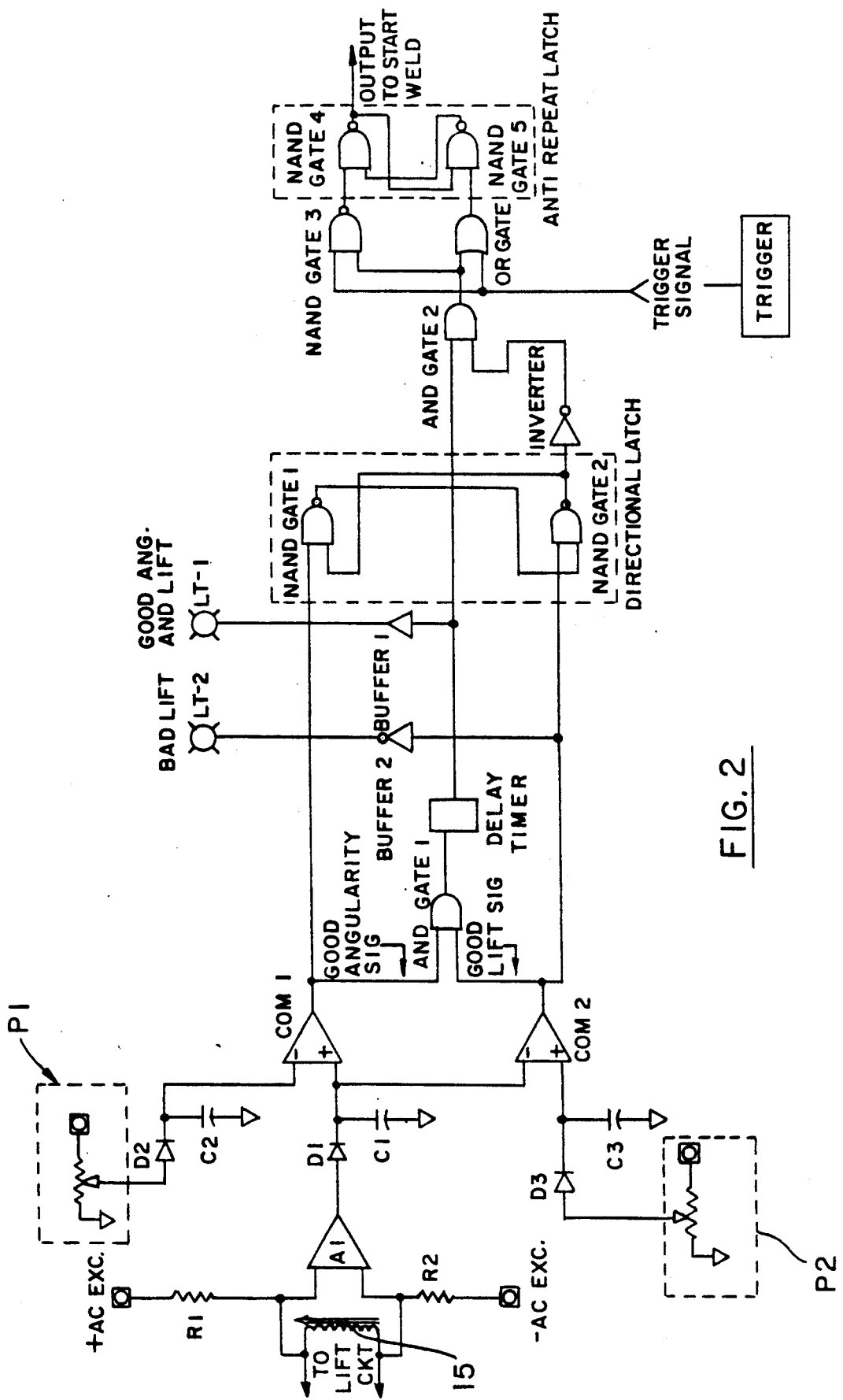
FIG. 2 is a schematic drawing of the control circuit for the stud welding gun.
Figure 3B:
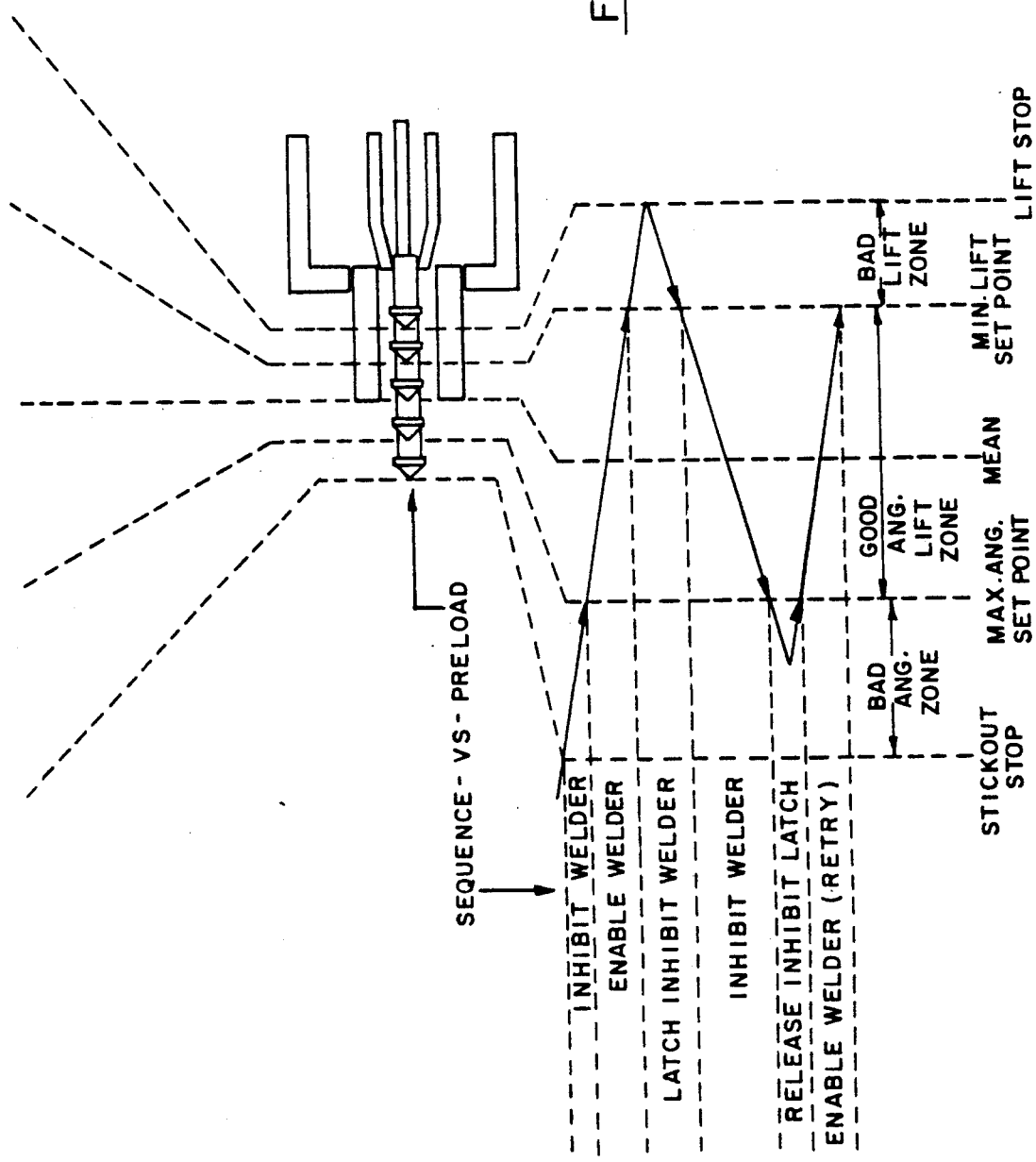

The circuit (FIG. 2) which controls this lift dimension (the TAL circuit) is connected across the coil 15 (the coil is connected to the lift circuit, not shown, but referred to as the lift CKT in FIG. 2). A differential A.C. current is supplied to the lift solenoid via a pair of high resistance resistors R1, R2 and an A.C. voltage appears across the lift solenoid which will have a magnitude directly proportional to the current applied and to the impedance of the coil 15. The applied current will be constant due to the relatively high resistance of the resistors R1, R2. Since the impedance of the coil is inversely related to the magnetic gap between the stator 14 and armature 16 of the solenoid, the voltage across the coil will be a function of armature position. Accordingly the voltage across the coil will be lowest when the stud is at the full stickout position and will increase as the stud is displaced toward the minimum lift position (see FIG. 3).

A differential amplifier A1 is connected across the coil to amplify and convert the A.C. position signal to a common referenced single ended output which is supplied to the anode of a first diode D1. This diode converts the A.C. amplifier output signal to an analog D.C. signal which is representative of armature position. A capacitor C10 which is connected to the D.C. output (cathode) of this diode D1 and to common, filters the analog position signal to a smooth D.C. voltage which is connected to the plus (+) input of a first comparator COM-1 and to the minus (−) input of a second comparator COM-2. An angularity set point potentiometer P1 has its end points connected to A.C. reference and common and has its slider connected to the anode of a second diode D2. The D.C. setpoint signal of this diode D2 is filtered by a second capacitor C2 and the smooth D.C. angularity output signal is connected to the minus (−) input of the first comparator. Similarly the A.C. lift set point signal of the second potentiometer P2 is converted to a D.C. signal by a third diode D3 and a third capacitor C3 filters this signal so that a smooth D.C. lift set point signal will be supplied to the plus (+) input of the second comparator COM-2. The angularity set point potentiometer P1 is used to set the maximum angularity set point and potentiometer P2 is used to set the minimum lift set point.

As a result the Good Angularity Signal which is the output of the first comparator COM-1 will go from low to high when the voltage is increased to beyond the maximum angularity set point. Similarly the Good Lift Signal which is the output of the second comparator COM-2 will go from high to low when the voltage is increased to beyond the minimum lift set point voltage.

The Good Angularity and Good Lift Signals are connected to the inputs of AND GATE 1 and the output of this and gate is connected to a Delay Timer. The output of the timer is connected through a first buffer (BUFFER 1) to the Good Angularity And Lift light LT-1. The output of the second comparator COM-2 is connected through a second reversing buffer BUFFER 2 (which is an inverting buffer) to the Bad Lift light LT-2. This light LT-2 is accordingly turned on when the output of the second comparator COM-2 goes low. If the angularity of the surface (or the concavity of the surface) exceeds the maximum allowed the Good Angularity Signal will be low and the AND GATE 1 will never issue a signal to the timer since this and gate requires two high signals. As a result the Good Angle And Lift light LT-1 will never be lit. These lights help the operator during setup and troubleshooting.

If the degree of convexness is beyond that which is acceptable the gap between the stator and armature will be less than the minimum acceptable gap and as a result the output of the second comparator COM-2 will go from high to low. Again the Good Angularity And Lift light LT-1 can not operate. In addition when this comparator goes low the second buffer will turn the Bad Lift light LT-2 on. Only if the surface is between these two extremes will the output of both comparators be high thereby starting the Delay Timer. Since the good zone lies between two bad zones (see FIG. 3), the stud must pass through the good lift zone to get to the bad lift zone. Normally this happens quickly and the period of the timer need be only be long enough so that the good lift zone will be ignored and the operation of the gun can be inhibited on a bad lift condition.

A Directional Latch is provided to insure that if too small a lift dimension is decoded, the operator will not be able to defeat this function by withdrawing the weld gun slightly. The output of the first comparator COM-1 is connected to one input of Nand Gate 1 and the output of the second comparator COM-2 is connected to one input of AND GATE 2. These nand gates are connected in the cross coupled configuration and act as the Direction Latch which will be set when the output of the second comparator COM-2 goes low. To reset the Directional Latch NAND GATE 1 must receive a new low signal which means that the gun must be withdrawn at least to the bad angularity position and reasserted to the workpiece.

The output of the Directional Latch (output of NAND GATE 2) is connected to AND GATE 2 via an INVERTER. This connection provides an enable signal for the delayed Good Angularity And Lift signal through AND GATE 2.

The output of AND GATE 2 is connected to one input of NAND GATE 3 and also to one input of the OR GATE. The gun TRIGGER SIGNAL which is generated when the TRIGGER is operated is connected to the other input of NAND GATE 3 and also to the other input of the OR GATE. NAND GATE 4 and NAND GATE 5 are connected in the cross coupled formation and act as the anti-repeat latch which will insure that the trigger is not held in the on position between welds and which will also insure against misadjusting the angularity set point so that the angularity function remains activated between welds with no stud preload. The output of Nand Gate 4 is the anti-repeat latch output. This output is connected to the welder start weld input. This signal must be reset to the low state in order to start another weld. This is done by deactivating the trigger and removing the gun from the workpiece with the angularity set point potentiometer P1 properly set so that the angularity function is deactivated causing a low from the OR GATE to one input of the NAND GATE 5 which resets the ANTI REPEAT LATCH between each weld enabling the next weld cycle. The ANTI REPEAT LATCH accordingly holds the start weld output on until both trigger and angularity functions are deactivated. This will not allow the welder to make anymore welds until the defeat or defeats are cleared.

I claim:

1. An arc stud welding system comprising a stud welding gun including a D.C. lift solenoid having a stator having a coil and armature means including stud gripping means for lifting said stud gripping means away from a workpiece, said armature means being displaceable from a lift stop position where said armature means engages said stator, sequentially through a minimum lift gap position spaced from said lift stop position and maximum lift gap position to a full stickout position beyond said maximum lift gap position, a trigger displaceable to a selected position to issue a trigger signal, means for receiving said trigger signal and for issuing a start to weld signal if said armature means is located between said minimum and maximum lift gap positions, and means for receiving said trigger signal but not issuing a start to weld signal if said armature means is located between said lift stop position and said minimum lift gap position or between said maximum lift gap position and said full stickout position.

2. An arc stud welding system according to claim 1 wherein said receiving and issuing means comprises a differential amplifier having an A.C. output connected across said coil, means for applying a constant voltage across said coil whereby the output of said amplifier will be a function to the position of said armature means, as said armature means is displaced from said lift stop to said full stickout position, and means for converting the A.C. output of said differential amplifier means to a D.C. signal which is representative of armature position.

3. An arc stud welding system according to claim 2, further comprising directional latch means for preventing the issuance of a start to weld signal once said armature means has been located between said lift stop and minimum lift gap positions, by withdrawing the gun away from the workpiece to thereby relocate said armature means between said minimum and maximum lift gap positions.

4. An arc stud welding system according to claim 3, wherein said receiving and issuing means further comprises anti repeat latch means for preventing issuance of a second trigger signal in the event said trigger is held at said selected position following the issuance of a first trigger signal.

* * * * *